United States Patent

Dutcher et al.

Patent Number: 6,158,886
Date of Patent: Dec. 12, 2000

[54] HEAT SHIELD WITH MOLDABLE INSULATION

[75] Inventors: Dale E. Dutcher, Pasadena; Larry W. Crump, Crosby, both of Tex.

[73] Assignee: Gay Engineering & Sales Company, Inc., Pasadena, Tex.

[21] Appl. No.: 09/173,485

[22] Filed: Oct. 14, 1998

[51] Int. Cl.$^7$ .................................... G01K 7/00
[52] U.S. Cl. ..................... 374/179; 374/147; 374/208
[58] Field of Search .................. 374/179, 208, 374/147

[56] References Cited

U.S. PATENT DOCUMENTS

| | | | |
|---|---|---|---|
| 3,143,439 | 8/1964 | Hansen | 374/208 |
| 3,776,039 | 12/1973 | Bowen | 374/147 |
| 3,874,239 | 4/1975 | Finney | 374/147 |
| 3,901,080 | 8/1975 | Hilborn | 73/343 |
| 5,141,335 | 8/1992 | Wannamaker et al. | 374/208 |
| 5,172,979 | 12/1992 | Barkley et al. | 374/147 |
| 5,322,181 | 6/1994 | Nelson | 220/461 |
| 5,382,093 | 1/1995 | Dutcher | 374/208 |
| 5,711,608 | 1/1998 | Finney | 374/147 |
| 5,993,061 | 11/1999 | Drouet | 374/147 |

FOREIGN PATENT DOCUMENTS

| | | | |
|---|---|---|---|
| 2062860 | 5/1981 | United Kingdom | 374/147 |

OTHER PUBLICATIONS

Enjay Company Inc. Advertizement paper, the Oil and Gas Journal, p. 130, no date.

*Primary Examiner*—G. Bradley Bennett
*Assistant Examiner*—Gail Verbitsky
*Attorney, Agent, or Firm*—Felsman, Bradley, Vaden, Gunter & Dillion, LLP; Frank S. Vaden, III

[57] ABSTRACT

A temperature monitoring assembly adapted to be positioned adjacent a structure in order to make temperature measurements at the surface of the structure is provided. The assembly includes a thermocouple means, a pad adapted for weldable attachment to the surface of the structure and having a slot therein for securing an end of the thermocouple means adjacent the surface of the structure at a desired location, and a heat shield forming a partially enclosed volume and having an opening shaped to conform to the surface of the structure so as to protect the thermocouple means from radiated heat when the shield is placed upon and welded to the structure over the thermocouple means. A portion of the thermocouple means extends though a slot in the heat shield to communicate measured temperature data. Insulating material is positioned within the partially enclosed volume of the heat shield for thermally isolating the thermocouple means so that the thermocouple means is substantially exposed only to heat transferred from the structure. The insulating material is moldable to the shape of the pad and the thermocouple means and hardens to a semi-rigid form, whereby premolding of the insulating material within the heat shield ensures that the heat shield will be properly placed over the pad and the thermocouple means for accurate temperature measurement of the structure.

6 Claims, 2 Drawing Sheets

HEAT SHIELD WITH MOLDABLE INSULATION

BACKGROUND OF THE INVENTION

1. Field of the Invention

The present invention relates to apparatus for measuring temperatures, and more particularly to apparatus for temperature measurement of structures placed in extreme environments such as process furnaces for petrochemical applications.

2. The Related Art

Many industrial processes, particularly the petrochemical industry, require accurate measurement of the surface or "skin" temperatures of structures such as tubes or pipes placed within a furnace or other vessel. Such temperature monitoring is necessary to avoid overheating conditions and possible failures. For this purpose, measuring devices such as thermocouples are placed at locations on the pipe or other structure that are expected to encounter the greatest exposure to heat sources, such as from radiation or flame exposure in a furnace. A common problem in such applications is the generally short life expectancy of unprotected thermocouples that are exposed to such temperature extremes.

A further problem relates to the method of attachment of the thermocouples to the pipe or other structure. Generally it is necessary to attach the thermocouple cables to pipe by welding. Thus, replacement of a thermocouple is both time consuming and expensive because the weld must be ground down to remove the thermocouple. Such removal requires a process shutdown to perform, and further requires extreme care to ensure that the pipe is not weakened by penetrating its surface.

In response to these problems, a removable temperature measuring device has been developed. This device is described in U.S. Pat. No. 5,382.093, which is assigned to Gay Engineering & Sales Co., Inc., the owner of the present invention. The device includes a sheathed thermocouple adapted to be removably inserted into the open end of a curved guide tube that carries a positioning pad at its closed end. The pad is welded to the pipe whose temperature is to be measured, and a similarly curved, insulated heat shield is positioned over the guide and the pad, and then also welded to the pipe. In this manner, the thermocouple is easily replaced by pulling it free of the guide tube.

While useful for its intended purpose, the device of the '093 patent requires that the thermocouple be precisely placed within the heat shield for accurate measurement, e.g., of a pipe's skin temperature. In other words, proper thermocouple placement relative to the heat shield is critical for accurate skin temperature measurement. The insulation disclosed in the '093 patent is sold under the trademark KAO-WOOL, and is an easily deformable blanket-like material having a low heat transfer coefficient. Thus, there is no "hard" recess or boundary that dictates proper placement of the heat shield over the welded pad and thermocouple.

Furthermore, the ease with which the KAO-WOOL insulation is compressed makes it possible for the shield to be installed even if excessive weld material has been applied when attaching the thermocouple positioning pad to the structure or pipe. Excessive weld material applied to the positioning pad will likely cause heat to be transferred from the shield to the weld pad, and thereby cause the thermocouple secured by the pad to indicate an artificially high pipe skin temperature.

In response to these problems, it is an object of the present invention to provide a moldable insulating material within a heat shield that can be conformed to the shape of the weld pad and the thermocouple element to ensure that the shield is precisely placed over the pad and thermocouple for proper skin temperature measurement.

It is a further object to provide such a moldable insulating material having sufficient rigidity that the material will not be able to lie flush against the pipe surface if excessive weld material has been applied to the weld/positioning pad.

SUMMARY

The objects described above, as well as other objects and advantages are achieved by a temperature monitoring assembly adapted to be positioned adjacent a structure in order to make temperature measurements at the surface of the structure. The assembly includes a thermocouple means, a pad adapted for weldable attachment to the surface of the structure and having a slot therein for securing an end of the thermocouple means adjacent the surface of the structure at a desired location, and a heat shield forming a partially enclosed volume and having an opening shaped to conform to the surface of the structure so as to protect the thermocouple means from radiated heat when the shield is placed upon and welded to the structure over the thermocouple means. A portion of the thermocouple means extends though a slot in the heat shield to communicate measured temperature data. Insulating material is positioned within the partially enclosed volume of the heat shield for thermally isolating the thermocouple means so that the thermocouple means is substantially exposed only to heat transferred from the structure. The insulating material is moldable to the shape of the pad and the thermocouple means and hardens to a semi-rigid form, whereby premolding of the insulating material within the heat shield ensures that the heat shield will be properly placed over the pad and the thermocouple means for accurate temperature measurement of the structure.

In one embodiment of the temperature monitoring assembly, the thermocouple means includes a sheathed thermocouple encased within a deformable jacket that extends through the slot in the heat shield, and the deformable jacket has an end that is secured in the weldable pad.

In another embodiment of the temperature monitoring assembly, the thermocouple means includes a guide tube preshaped to conform to the surface of the structure. The thermocouple means again includes a sheathed thermocouple encased within a deformable jacket, but the deformable jacket is removably positionable within the guide tube, whereby replacement of the sheathed thermocouple is simplified.

BRIEF DESCRIPTION OF THE DRAWINGS

In the drawings, wherein like reference characters are used throughout to describe like parts.

DETAILED DESCRIPTION OF THE PREFERRED EMBODIMENT

Figure 1:
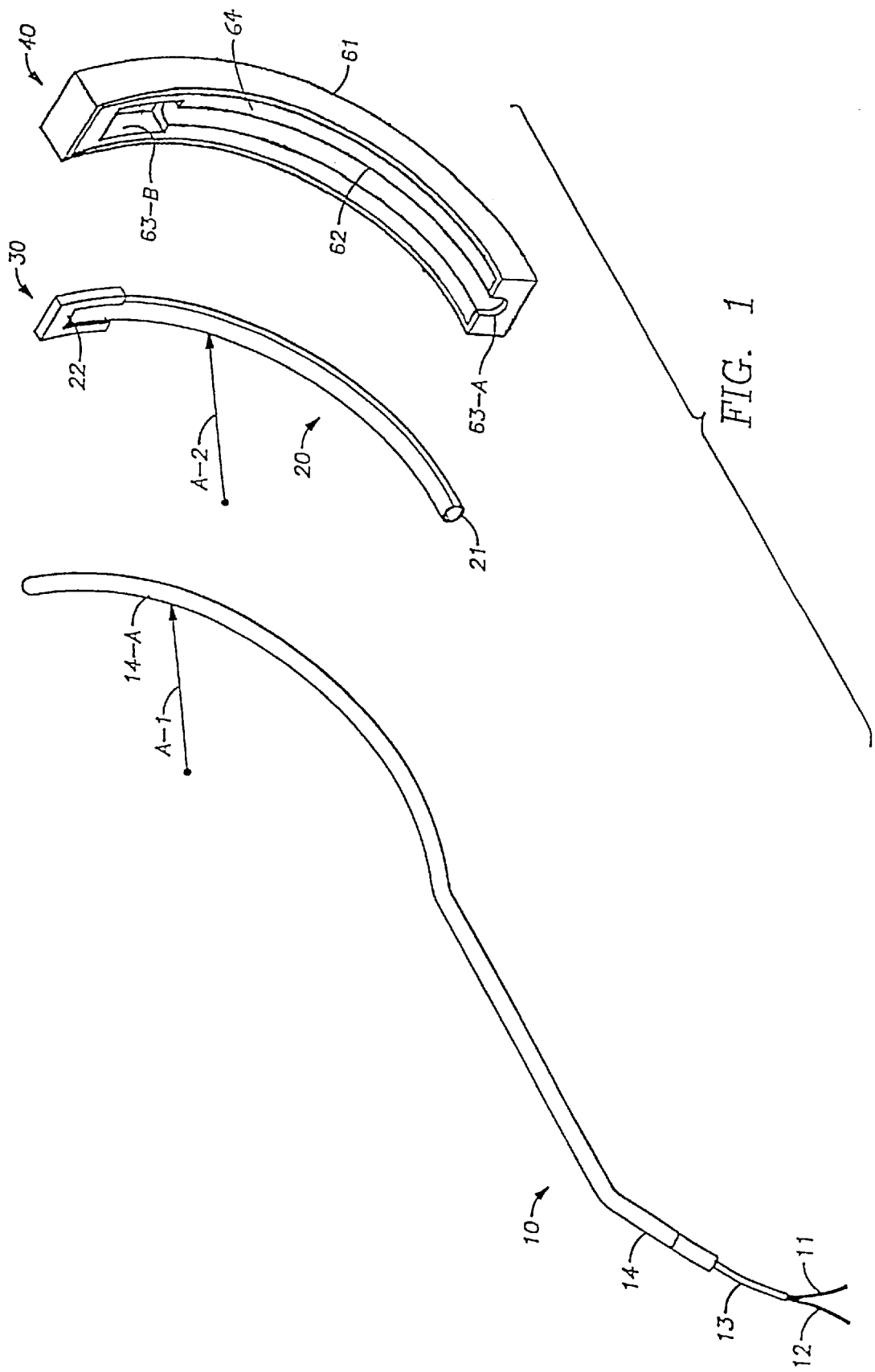
FIG. 1 is a perspective view of the components of one embodiment of the present invention.
Figure 2:
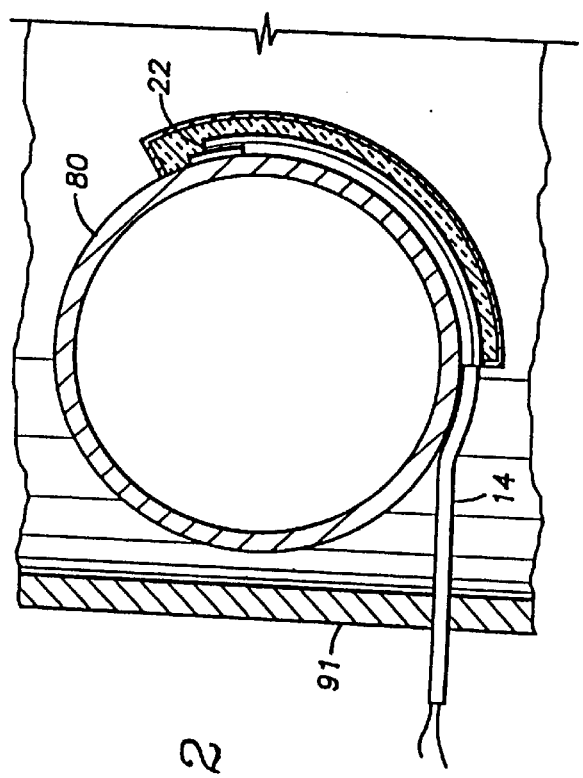
FIG. 2 is an elevational sectional view through a pipe whose temperature is being measured in accordance with the present invention.
Figure 3:
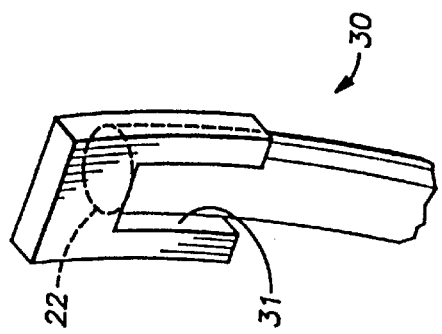
FIG. 3 is a detailed perspective view of the positioning pad attached to a tube guide for a thermocouple.

FIGS. 1–3 illustrate a temperature monitoring assembly that includes foremost a thermocouple means for monitoring the surface or skin temperature of a structure, such as a conduit or pipe, placed in an extreme environment such as a furnace. A preferred embodiment of the thermocouple means is represented in FIG. 1 generally by numerals 10 and 20. Thus, sheathed thermocouple 10 includes a pair of lead wires 11 and 12 formed of differing materials such that when joined at one end, an electromotive force is generated that is a function of the temperature at the junction of the wires. Insulation 13 surrounds the lead wires forming a cable that is inserted in deformable outer jacket 14. Those skilled in the art will appreciate that additional insulation and/or packing can be used in this arrangement as desirable. The thermocouple junction is positioned at or near end 14-A of jacket 14. The ends of wires 11 and 12 opposite the junction are connected to instrumentation (not shown) for monitoring the temperature data produced at the thermocouple junction.

Guide tube 20 is fabricated with open end 21 and closed end 22. The inside diameter of tube 20 is large enough to permit thermocouple element 10 to have its end 14-A inserted into the tube's open end 21 and pushed through the entire length of the tube so as to position the thermocouple junction adjacent tube end 22. Guide tube 22 can be provided, e.g., with an arcuate configuration of 120° and a radius of curvature A-2 substantially equal to the radius of curvature A-1 of thermocouple element 10. Other configurations are also used, including arcuate configurations of greater or lesser angles. Furthermore, the shield can be of a linear form, instead of curved, such that the shield is coaxial with the pipe or conduit rather than extending radially around the pipe or conduit.

A weldable disc or pad 30 is connected to end 22 of the guide tube via opening 31 in the pad, as shown particularly in FIG. 3. Pad 30 serves to position the thermocouple junction in a desirable position on the surface of pipe 80 within the confines of walls 91 of a vessel or furnace, as seen in FIG. 2. The present invention thus encompasses, in a preferred embodiment, the use of guide tube 20 as an indirect means for proper positioning of the thermocouple junction via pad 30, as shown in FIG. 1.

Figure 4:
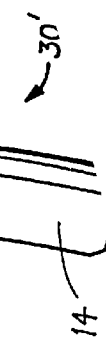
FIG. 4 is a detailed perspective view of the positioning pad attached to a deformable jacket for a thermocouple.

However, the present invention further encompasses, in another embodiment, the placement of jacket 14 directly within opening 31' of pad 30' without the use of guide tube 20, as shown in FIG. 4.

Heat shield member 40 protects the thermocouple element from radiated heat, and includes curved body 61 that forms a partially enclosed volume and has an opening shaped to conform to the surface of pipe 80. Body 61 also has an arcuate configuration of 120°, and a radius of curvature that approximates A-1 and A-2.

Shield body 61 is filled with moldable insulating material 64, such as ZIRCAR moldable insulation for thermally isolating the thermocouple means so that the thermocouple means is substantially exposed only to heat transferred from pipe 80. An impression is formed in the insulating material that matches pad 30 and guide tube 20 (or alternatively jacket 14), including semi-tubular recess 62 and pad-shaped recess 63-B, before the material sets. A slot 63-A is also provided in both the body and the insulating material for passage of thermocouple element 10. Alternately, a castable insulation material poured into a casting creates pre-formed insulation fitted to the shape of shield body 61.

The moldable insulating material normally air dries in 24 to 48 hours, with all the properties of a pre-fired insulation. Curing is accomplished with a hot air gun or torch, or by immediate temperature exposure in the application. Because insulating material 64 hardens to a semi-rigid form, pre-molding of the insulating material within the heat shield ensures that the heat shield will be properly placed over the pad and the thermocouple means for accurate temperature measurement of the structure. Also, due to the geometry of shield body 61, the hardened insulating material is fixed within the shield, and cannot be inadvertently removed, as was the case with the KAO-WOOL material. Likewise, the semi-rigid nature of the cured insulation material eliminates the possibility of the insulation being moved out of proper position within the shield during the installation of the product in the field. Furthermore, if too much weld material has been used to attach pad 30 to pipe 80, heat shield member 40 will not fit flush against pipe 80. In this instance, the installer will know to grind down the excess weld material, and will thereby avoid unwanted heat being transferred to the thermocouple element from the heat shield via the excess weld material.

The use of moldable or castable insulation material permits customization of the thermal shielding properties of the shield through controlling the thickness and/or the density of the insulating material used.

During normal operation, the assembly of guide tube 20 and pad 30 (or jacket 14) is positioned on conduit 80 at the location to be measured. Pad 30 is attached to pipe 80 by welding or other suitable means. Heat shield 40 is then positioned over guide tube 20 and pad 30, and similarly affixed to pipe 80. Because insulating material 64 is preformed to the shape of the guide tube and pad and the cured material is semi-rigid, the installer cannot fail to properly position heat shield body 61 over the pad and guide tube (or jacket 14).

With guide tube 20 properly attached to tube 80, thermocouple element 10 is inserted into open end 21 and rotated 120° until its end 14-A, containing the thermocouple junction, firmly contacts closed end 22. Element 10 can then be securely, but removably held in position using any number of suitable fastening means (not shown), such as reusable clips anchoring element 10 to conduit 80, tube 20, or shield 40. Replacement of thermocouple 10 is easily accomplished by disengaging the fastening means without the need for extensive grinding or rewelding.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims, such claims being drawn to an invention which satisfies one or more of the above mentioned problems.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a temperature monitoring assembly adapted to be positioned adjacent a structure in order to make temperature measurements at the surface of the structure, the assembly including a thermocouple means, a pad adapted for weldable attachment to the surface of the structure and having a slot therein for securing an end of the thermocouple means adjacent the surface of the structure at a desired location, a heat shield forming a partially enclosed volume and having an opening shaped to conform to the surface of the structure so as to protect the thermocouple means from radiated heat when the shield is placed upon and welded to the structure over the thermocouple means, a portion of the thermocouple means extending though a slot in the heat shield to communicate measured temperature data, and insulating material positioned within the partially enclosed volume of the heat shield for thermally isolating the thermocouple means so that the thermocouple means is substantially exposed only to heat transferred from the structure, the improvement comprising:

the insulating material is moldable to the shape of the pad and the thermocouple means and hardens to a noncompressible form, the insulating material being premolded within the heat shield such that the heat shield is properly placed over the pad and the thermocouple means for accurate temperature measurement of the structure.

2. The temperature monitoring assembly of claim 1, wherein the insulating material is molded in a casting such that the insulating material fits within the heat shield.

3. The temperature monitoring assembly of claim 1, wherein the thermocouple means includes a sheathed thermocouple encased within a deformable jacket that extends through the slot in the heat shield, the deformable jacket having an end that is secured in the weldable pad.

4. The temperature monitoring assembly of claim 3, wherein the thermocouple means includes a guide tube preshaped to conform to the surface of the structure, the deformable jacket being removably positionable within the guide tube.

5. The temperature monitoring assembly of claim 1, wherein the insulating material is capable of withstanding temperatures in excess of one thousand degrees Fahrenheit.

6. The temperature monitoring assembly of claim 1, wherein the insulating material is an alumina-silica compound.

\* \* \* \* \*

UNITED STATES PATENT AND TRADEMARK OFFICE
CERTIFICATE OF CORRECTION

| | |
|---|---|
| PATENT NO. | : 6,158,886 |
| APPLICATION NO. | : 09/173485 |
| DATED | : December 12, 2000 |
| INVENTOR(S) | : Dale E. Dutcher et al. |

It is certified that error appears in the above-identified patent and that said Letters Patent is hereby corrected as shown below:

Col. 1, line 3 enter before the section entitled "Background of the Invention":

CROSS-REFERENCE TO RELATED APPLICATIONS

The present application claims priority to U.S. Provisional Patent Application No. 60/062,360 filed October 15, 1997.

Signed and Sealed this

Sixth Day of April, 2010

David J. Kappos
*Director of the United States Patent and Trademark Office*